United States Patent [19]

Ward

[11] Patent Number: 5,551,411
[45] Date of Patent: Sep. 3, 1996

[54] DILUTION CONTROLLED LEAN BURN SYSTEM

[75] Inventor: Michael A. V. Ward, Lexington, Mass.

[73] Assignee: Combustion Electromagnetics, Inc., Arlington, Mass.

[21] Appl. No.: 379,643

[22] PCT Filed: Sep. 19, 1993

[86] PCT No.: PCT/US93/02729

§ 371 Date: Feb. 2, 1995

§ 102(e) Date: Feb. 2, 1995

[87] PCT Pub. No.: WO94/03717

PCT Pub. Date: Feb. 17, 1994

[51] Int. Cl.$^6$ .......................... F02D 41/00; F02M 23/00; F02M 25/00
[52] U.S. Cl. .......................................................... 123/684
[58] Field of Search ..................... 123/680, 698, 123/674, 489, 520, 430, 571, 478, 568, 569

[56] References Cited

U.S. PATENT DOCUMENTS

| | | | |
|---|---|---|---|
| 4,748,959 | 6/1988 | Cook et al. | 123/520 |
| 5,090,388 | 2/1992 | Hamburg et al. | 123/489 |
| 5,172,550 | 12/1992 | Takeshima | 123/698 |
| 5,216,998 | 6/1993 | Hosoda et al. | 123/698 |
| 5,241,943 | 9/1993 | Miyashita et al. | 123/679 |
| 5,331,940 | 7/1994 | Takayama | 123/698 |
| 5,363,830 | 11/1994 | Morikawa | 123/674 |

*Primary Examiner*—Raymond A. Nelli
*Attorney, Agent, or Firm*—Jerry Cohen

[57] ABSTRACT

Lean burn, exhaust gas recirculating internal combustion engine system (10) and process of operation wherein a motor driven valve (16) governs tapping of exhaust gas via a conduit (11) to the high pressure side of a throttle (14) in an air intake region of the engine with control of the valve and lean burn to maintain a) lean operation with high exhaust dilution at light engine loads, b) high exhaust dilution and high overall dilution at medium to high engine loads and c) smooth transition between a) and b).

43 Claims, 6 Drawing Sheets

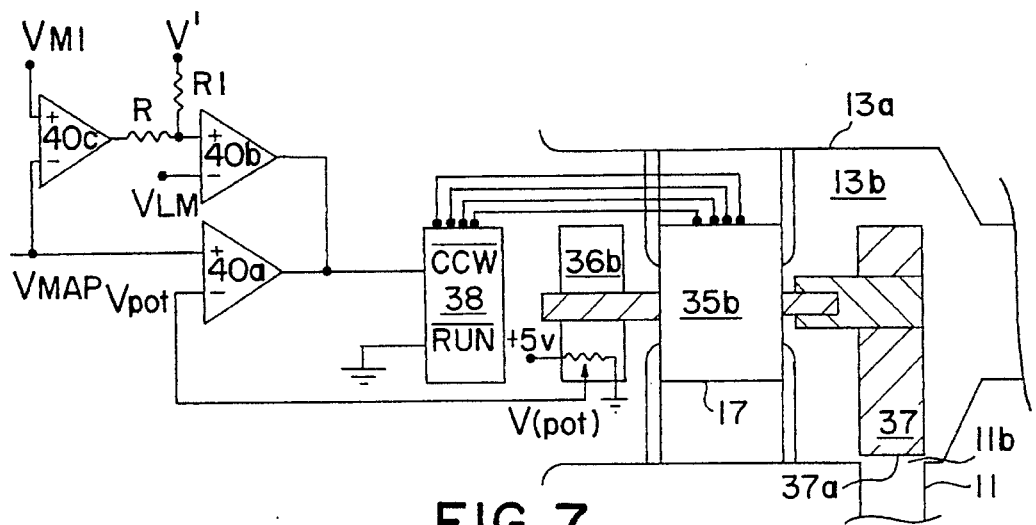
FIG. 7
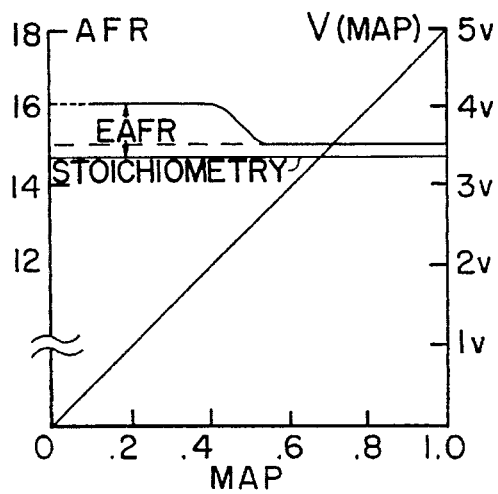
FIG. 7b
| | |
|---|---|
| MAP < MAP1 | : CCW OPEN |
| MAP > MAP1 | : CCW CLOSE |
| Vp < VM | : CW |
| Vp > VM | : CCW |
| MAP > MAP1 (VMAP > VM1) | |
| Vem > V1 | : CCW CLOSE |
| Vem < V1 | : NO EFFECT |
| MAP < MAP1 | : NO EFFECT |
FIG. 7a
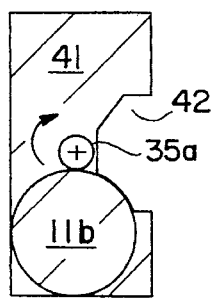
FIG. 8a
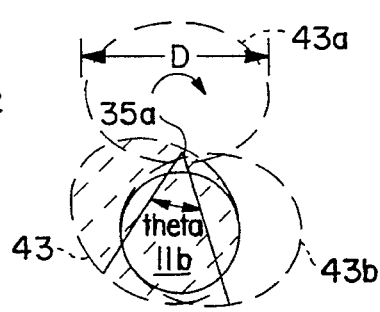
FIG. 8b
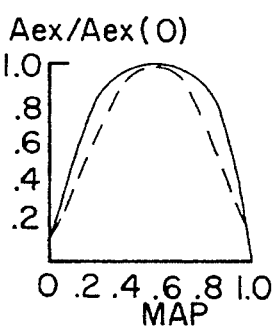
FIG. 8c

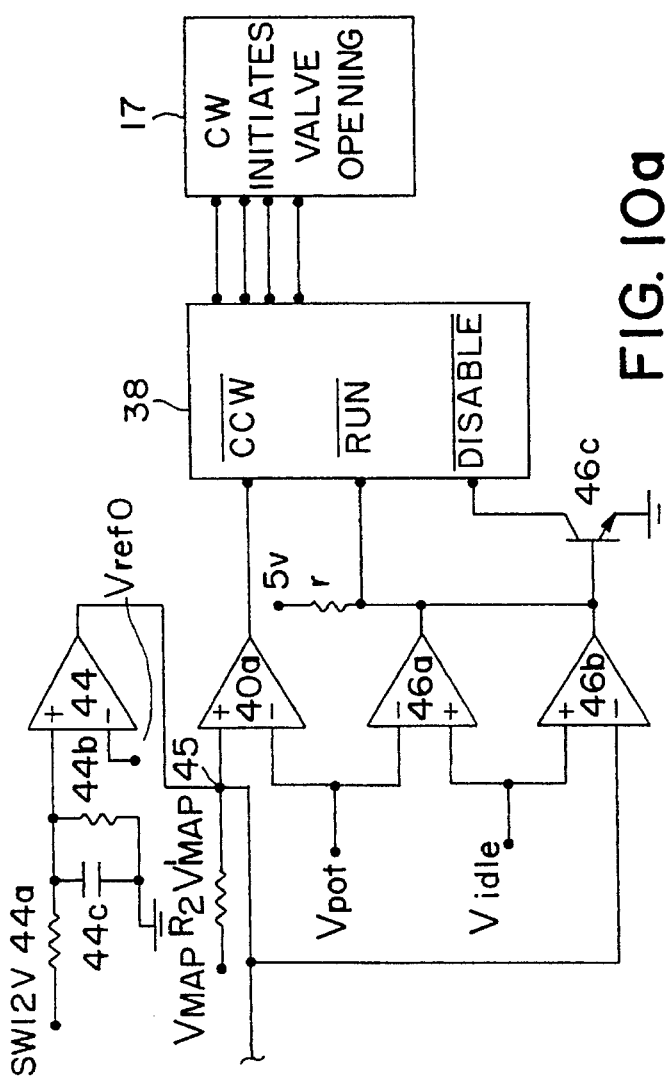
FIG. 10a
VMAP > VMI : Vx > .5 : NO EFFECT; Vx<.5 : $\overline{CCW}$ *
VMAP < VMI : Vx > .5 : $\overline{CCW}$ ; Vx < .5 : NO EFFECT
FIG. 10d
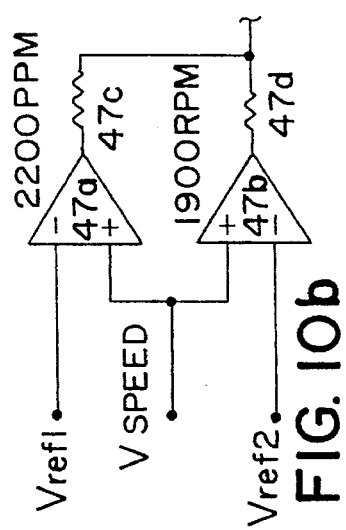
FIG. 10b
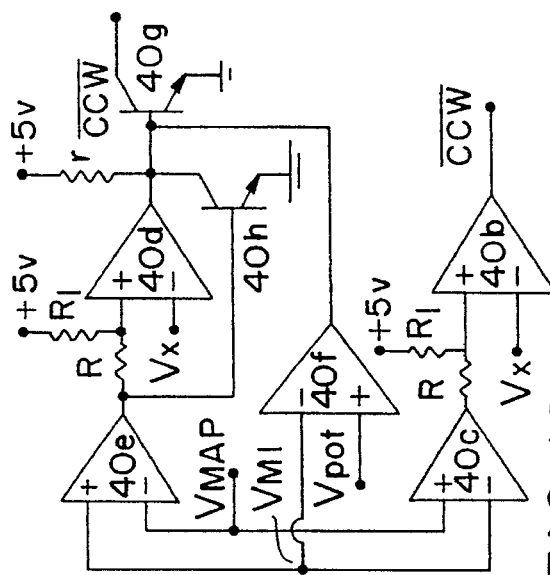
FIG. 10c

DILUTION CONTROLLED LEAN BURN SYSTEM

BACKGROUND OF THE INVENTION AND PRIOR ART

The present invention relates to a system for optimizing operation of lean burn internal combustion (IC) engines for achieving the best trade-off between exhaust emissions, fuel economy, and engine power. The invention includes: 1) a strategy or process, 2) a general apparatus, and 3) a range of preferred embodiments for combining engine air, exhaust gas, and fuel in relation to engine intake air manifold absolute pressure (MAP) for achieving optimization of exhaust emissions, efficiency, and power. The invention preferably employs recently improved forms of very high power, very high energy (VHE) ignition disclosed in several prior patents and patent applications, including U.S. Pat. No. 4,677,960 on voltage doubling, U.S. Pat. No. 4,774,914 on piston firing, U.S. Pat. No. 4,841,925 on enhanced toroidal gap ignition, U.S. patent application Ser. No. 07-350,945 (now abandoned) on high efficiency and high output coils, U.S. patent application Ser. No. 07-684595 now U.S. Pat. No. 5,131,376 on distributorless capacitive discharge ignition, and U.S. patent application Ser. No. 07-755,795 (now abandoned) on integrated converter ignition, which enhance the practicality of using the high air-fuel ratio and high exhaust dilution of the present invention for achieving said optimization. The present invention applies to all IC engines, and especially to four-stroke engines where NOx is relatively high and must be reduced and where fuel economy may be significantly improved over current approaches, i.e. the three-way catalyst approach and the lean burn approach.

In the three-way catalyst approach the air-fuel ratio is maintained at stoichiometry throughout the engine operating range by use of a lambda sensor. This results in relatively low NOx emissions but significantly compromised fuel economy (even when exhaust gas recirculation is employed via an EGR valve). In this approach engine-out (versus tailpipe) emissions are high, so that the system is not stable against malfunctions or even small departures from stoichiometric operation.

In modern commercial lean burn approaches the engine is operated at high air-fuel ratios (excess air) which improves fuel economy but does not reduce NOx to the required level, especially at high loads. Furthermore, modern commercial lean burn engines depend entirely on sophisticated engine design, i.e. intake air swirl and air tumble motion, to provide the very lean air-fuel ratio capabiity, and are thus not amenable for retrofit onto older cars (as in the case of the present invention). When further NOx reduction is required, they revert to the use of the conventional three-way catalyst approach with EGR, as described in SAE paper 920455, February 1992, by Honda Motors. Furthermore, the EGR valve adds the exhaust on the low pressure side of the throttle by means of engine vacuum and does not attempt to add the exhaust gas to a lean mixture in an optimized way as disclosed in the present invention.

Unconventional ways of operating lean burn engines, and advantages of doing so, are disclosed in my prior patent applications: U.S. patent application Ser. No. 07-685,057 (now U.S. Pat. No. 5,211,147) where reverse stratification is disclosed for reducing NOx, U.S. patent application Ser. No. 07/698,967 (now abandoned) where boosting of the intake air is disclosed for reducing NOx at high pressures, and U.S. patent applications 07/765,896 (now abandoned) and 07/854,074 (now abandoned) where methods of using exhaust gas in a lean burn mode are disclosed for reducing NOx emissions over a wide range of conditions.

General issues of engine emissions and fuel economy are discussed in many texts, and the following are a sampling of texts which discuss these issues in some degree: "Internal Combustion Engines and Air Pollution" by E. F. Obert (Intext Educational Publishers 1973); "Internal Combustion Engine Fundamentals" by John B. Heywood (McGraw-Hill Book Company, 1988); and the manual "Bosch Automotive Electric/Electronic Systems"(Robert Bosch GmbH 1988).

The present invention can be utilized with a variety of fuels including conventional petroleum-derived hydrocarbon mixture fuels, e.g., gasoline, or non-conventional petroleum and/or plant derived fuels, e.g., methanol, ethanol, natural gas, alcohol-hydrocarbon mixtures, etc. Discussion is limited to the conventional fuels, it being understood that the points discussed herein are applicable to all fuels with the appropriate correction factors well known to those skilled in the art.

Some terms used herein are now defined:

(1) Air-Fuel Ratio (AFR): The weight ratio of air to fuel (lbs to lbs or kilograms to kilograms) as the vapor form equivalent of given weights of air and fuel at standard temperature and pressure (STP) in accordance with standard industry practice which takes AFR of 14.7 to 1 (14.7:) as the stoichiometric ratio (14.7 lbs of air combusting 1 lb of gasoline). An alternate expression of AFR is lambda ($\lambda$), wherein lambda equals AFR/(AFR)stoichiometry, or 1.0 at stoichiometric mix and STP conditions. AFR varies in accord with certain engine settings, principally engine speed and manifold absolute pressure (MAP).

(2) Gas-fuel ratio (GFR): As used herein, is the same as air-fuel ratio excepting that the component that comprises air in this case includes exhaust gas, i.e. the "gas" comprises a combination of fresh intake air and exhaust gas.

(3) Exhaust-fuel ratio (EFR): As used herein is defined as the difference between gas-fuel ratio and air-fuel ratio, i.e. EFR=GFR−AFR, and represents the ratio of the amount of exhaust gas introduced into the intake stream to the amount of fuel introduced.

(4) Excess air-fuel ratio (EAFR): As used herein is defined as the difference between air-fuel ratio and stoichiometry, and represents the ratio of the amount of excess air introduced into the intake stream to the amount of fuel introduced.

(5) Lean-Burn (or Lean of Stoichiometric, or dilute charge): Operation of an IC engine at AFR above stoichiometric, i.e. at or above 15:1 AFR for lean burn gasoline engines.

(6) Three way catalyst and Lambda closed loop control: A multi-mode (three way catalyst) oxidation-reduction exhaust clean-up system which is used in a major portion of the world's automotive engines. A closed loop feedback maintaining lambda close to one is employed in state of the art systems.

(7) Exhaust Gas Recirculation (EGR): The process of exhaust or burnt gas (as a percentage) recirculation from the exhaust into the unburnt gas (the fuel-air mixture) at the low pressure side of the throttle, the recirculation occurring at most engine operating conditions but specifically excluding idle and WOT.

(8) Residual Gas or Residual Gas Fraction or Residual: The amount (fraction) of exhaust gas remaining in the inducted fuel-air mixture after the exhaust valve closes to participate in the combustion of the inducted mixture.

(9) Exhaust Gas Dilution (EGD): As used herein is the process of diluting the intake air with substantial amount of exhaust gas at the high pressure side of the throttle including at near WOT conditions, under conditions of lean burn so that the excess oxygen can be used to oxidize HC and CO without external injected air.

(10) Stratified Charge: Generally defined to mean the purposeful formation of a non-uniform fuel-air mixture or charge in the engine cylinder prior to combustion, where a locally richer mixture is produced at the spark plug site so as to help ignition of an overall leaner mixture.

(11) Ignition and Fuel Injection Timing: The degrees before top dead center (BTDC), or more simply before top center (BTC), of piston stroke (or rotary engine equivalent) where ignition and fuel injection respectively commence. Emissions and specific fuel efficiency as a function of advanced or retarded ignition timing have been substantially studied in the art.

(12) Valve Timing: The degrees, before and after top center (BTC and ATC) where the intake valve opens and the exhaust valve closes, and the degrees before and after bottom center (BBC and ABC) where the exhaust valve opens and the intake valve closes.

(13) Wide Open Throttle (WOT): The operating condition of an engine in which the throttle or other means controlling air-flow into the cylinder is opened to permit essentially the maximum amount of air to enter the cylinder.

(14) Manifold Absolute Pressure (MAP): The absolute pressure, typically in units of atmospheres, inside the intake manifold of an IC engine beyond the throttle plate, representing the pressure of the air which is inducted into the engine cylinders. A MAP value of 1.0 represents a pressure of one atmosphere at standard temperature inside the engine intake manifold.

Other related terms are defined below as used.

Primary interest in lean burn and stratified charge has come from developers of IC engines in specialty applications, e.g. stationary gas engines, and more recently to lean burn automobile engines to improve combustion (stability) and fuel economy, e.g. Toyota Motors, Honda Motors, and Mitsubishi Motors. Primary interest in catalysts and exhaust dilution have come from developers of three-way catalysts and EGR for use with such systems. These developers have failed to realize the potential benefits of properly prepared lean mixtures with high exhaust gas dilution. They have failed to successfully implement emerging technologies, especially very high energy (VILE) ignition, and have concentrated on a limited number of approaches based on three-way catalyst technologies and on lean burn technologies without exhaust dilution. For retrofit applications, three-way catalyst systems have not been implemented because of the need to include an air-pump and the requirement to limit, or even reduce, possible fuel economy gains achievable with the present system operated in a lean burn mode with exhaust gas dilution. Conventional lean burn has not been implemented because of the relatively high NOx levels.

In the above cited U.S. patent applications Ser. No. 07/765,896 (now abandoned) and 07/854,074 (now abandoned) are disclosed methods and apparatus for using principles of lean burn with high exhaust dilution to achieve significant improvements in emissions and fuel economy. The present invention builds on the ideas disclosed therein, including and not limited to the use of an exhaust gas dilution (EGD) tube with a control valve disclosed in the text of Ser. No. 07/765,896, and a strategy for use of exhaust dilution disclosed in the text of Ser. No. 07/854,074. Using this background, there is now disclosed a new principle or strategy, i.e. a process, for engine optimization, and there is further disclosed certain engine relationships which lead to a technique, i,e. a general apparatus, for realizing the optimization principle, and specific practical systems, i.e. preferred embodiments of process and apparatus for implementing the invention.

SUMMARY OF THE INVENTION

The present invention is based in part to the realization that engines using lean mixtures with exhaust gas dilution behave differently in terms of emissions and fuel economy as the ratio of excess air to exhaust gas is varied in the intake system. The excess air and exhaust gas diluents contribute differently to the fuel economy improvement and minimization of exhaust emissions as the engine manifold pressure (MAP) is changed. As a result, a dilution controlled lean burn, DCLB, strategy and system is developed which: a) operates with both exhaust gas dilution and excess air at low MAP values (since NOx is relatively low, HC is relatively high, and fuel economy is poor), b) operates with excess exhaust gas as the principal excess gas diluent at high MAP values (since NOx is high and fuel economy is best), and c) connects the low and high MAP regions in a continuous and optimum way governed by a novel equation, the dilution equation, $$EFR=K*[Aex/Aex(0)]*GFR(MAP) \qquad (1)$$

first disclosed herein that relates exhaust fuel ratio EFR to the exhaust dilution (EGD) tube (valve) orifice openings and to MAP through the GFR dependence.

As will be shown, a relatively simple system is provided which permits the excess air-fuel ratio EAFR to be set equal to about 1.0 AFR at low MAP values (for stoichiometry of 15 AFR), to be lowered to about 0.5 AFR at intermediate MAP values, and lowered to essentially zero at high MAP values for optimization. The term "about" as used herein is taken to be within a factor of one half to two of the number it qualifies, e.g. about 1 means within ½ and 2.

The technique or general apparatus for implementing the optimization strategy, i.e. for developing the dilution equation and defining its implementation, is based on the discovery of specific and simple relationships between exhaust pressure and engine MAP and speed (RPM), and the development of a simple relationship for flow through an exhaust gas dilution (EGD) tube as a function of MAP and RPM. These relationships are then taken with the relationship for intake flow as a function of MAP and RPM, from which is developed the dilution equation, a novel methodology for achieving the optimization strategy. Apparatus, devices, and systems are then derived from the foregoing analysis and used to implement the optimization strategy.

A preferred embodiment of a system incorporating the above optimization comprises an exhaust dilution valve mounted on the periphery of an annular tube section mountable on the air-intake of a carburetor or air-intake of a fuel injected engine, said valve actuated by a linear or rotary actuator drive means, preferably a stepper-motor, located diametrically across the valve. By locating the drive means across the valve on the intake air duct there is minimum heating of the drive by the exhaust gas and maximum cooling of the drive by the incoming air.

The motor (and valve) respond to a MAP sensor signal, which typically is a voltage linearly proportional to the MAP value, to move the dilution valve proportionally to define an exhaust tube orifice area Aex for producing an optimized EFR contour with GFR, and hence MAP, in accordance with the dilution equation (to produce the optimization strategy). In this way, the best combination of excess air and exhaust gas is introduced to improve fuel economy (through reduced engine pumping loss and increased fuel vaporization) and to minimize emissions by supplying sufficient air to oxidize HC and CO and sufficient exhaust diluent to minimize NOx at high loads.

In its operation, the present invention performs its optimization function in a way that is more natural to, and consistent with, the engine operation, leading to particularly simple forms of OEM and retrofit systems to accomplish the goal. The diluting of the mixture can be performed in the required prescribed way, practically and simply, over the entire range of MAP values; or it can be performed, with some compromise in optimization, by linking the orifice opening mechanically to the throttle as has been disclosed in part in my copending patent applications and is further disclosed herein.

In a preferred embodiment, the present invention employs a high degree of exhaust gas dilution which increases with engine MAP value up to near WOT so that the diluent is essentially all exhaust gas near WOT. Preferably, the exhaust is introduced at the high pressure side of the throttle through a double acting valve controlled by a motor responsive to the engine MAP value via an electronic controller. Preferably, at higher loads, adjustments to the exhaust level are made, and hence air-fuel ratio is set to just lean of, or at, stoichiometry via a lambda sensor connected to the controller.

The controller is preferably also responsive to other sensors such as air and water temperature for further fine adjustments to improve the optimization. Preferably, the exhaust dilution controlled lean burn (DCLB) system uses a very high energy (VHE) Ignition in order to be able to employ the maximum level of gas-fuel ratio (GFR), preferably a maximum GFR of approximately 22: 1, where the term approximately as used herein is taken to mean to within plus and minus 20% of the value the term qualifies, i.e. 18:1 to 9.6:1 as applied to the 22:1, GFR.

It is therefore a principal object of the present invention to define an optimization strategy for combining intake fresh air and exhaust gas under conditions of high gas-fuel ratio (very lean conditions) brought about by improved engine and/or ignition means, and to then employ engine air and exhaust flow relationships, including the dilution equation, for allowing said optimization to be realized, and then employing an actual system including valve means preferably operated by a stepper motor responsive to MAP values and lambda sensor through a controller means for more optimally realizing the relationships revealed by the dilution equation to produce, in actuality in the engine, the said defined optimization strategy.

The system is explained in further detail and other objects, features, and advantages of the invention will be apparent from the following detailed description of preferred embodiments given, by way of example, in conjunction with the accompanying drawings.

BRIEF DESCRIPTION OF THE DRAWINGS

FIG. 7 is an approximately two-thirds scale, partial schematic side-view cross-section drawing of an embodiment of a system comprised of a stepper motor and valve for mounting inside the air-intake system of an engine, including control means shown in partially schematic form, for implementing the dilution equation to realize the optimization strategy. FIG. 7a is a table of values of parameters defining operation of the control system of FIG. 7. FIG. 7b is an EAFR and MAP voltage graph generated by tile system of FIG. 7.

FIGS. 8a and 8b are partial end views of rotary gate type valves usable with the drive system of FIG. 6 and controller of FIG. 7. FIG. 8c is a plot of a typical orifice opening area versus MAP produced by the valves of FIGS. 8a, 8b.

FIGS. 10a to 10c are circuit drawings of part of the electronic controls for providing preferred operation of an air/exhaust gas dilution system for an optimized dilution controlled engine operation. FIG. 10d is a truth table corresponding to the controls of FIG. 10c.

DESCRIPTION OF PREFERRED EMBODIMENTS

Figure 1A:
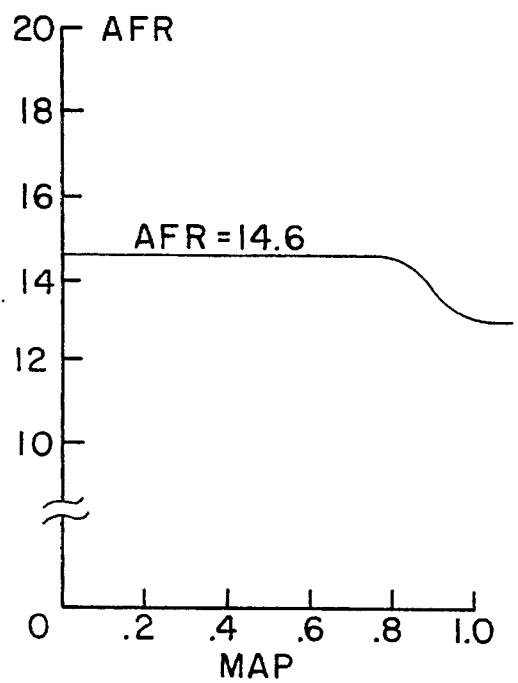
FIGS. 1a through 1d represent engine operating curves or characteristics of AFR/GFR versus engine MAP for four typical prior art engine cases including one (FIG. 1d) disclosed in a co-pending application.

FIGS. 1a through 1d represent engine operating curves, contours, or characteristics of AFR/GFR versus MAP, referred to hereinafter as "engine characteristics", for four prior art engine cases. FIG. 1a corresponds to the case of a three-way catalyst car without EGR, where AFR equals GFR, which is held at Just rich of stoichiometry except near and at WOT where the mixture is enrichened to approximately 13:1 AFR for best power (and poor emissions).

Figure 1B:
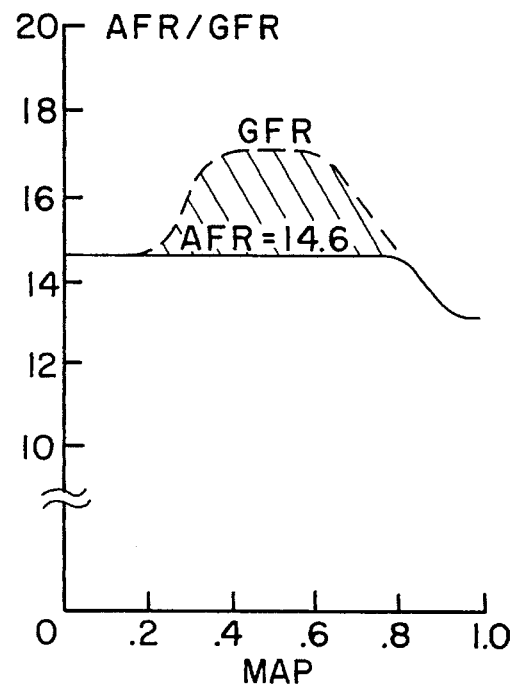

FIG. 1b corresponds to the case of FIG. 1a with EGR. In this application the EGR valve is operated by engine vacuum to open at above idle speeds and closes at below WOT to provide a 5% to 15% EGR under cruise conditions for lower NOx and marginally better fuel economy, typically a few percent at best.

Figure 1C:
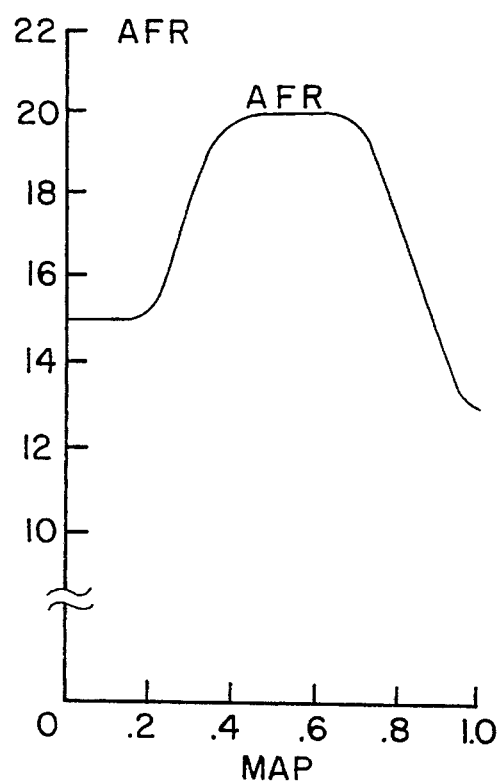

FIG. 1c corresponds to the case of the typical current design lean burn engine which has an AFR of essentially stoichiometry at idle, which increases to a high AFR, e.g. approximately 20:1 AFR, at cruise conditions (of 0.3 to 0.6MAP), and then begins to decrease to an AFR of approximately 13:1 at WOT. NOx emissions are high at high MAP values, i.e. from approximately 0.7 to 0.9MAP, which is the main shortcoming of this approach (NOx is relatively low at WOT because of the rich AFR and because typically a three-way catalyst is used in these new applications).

Figure 1D:
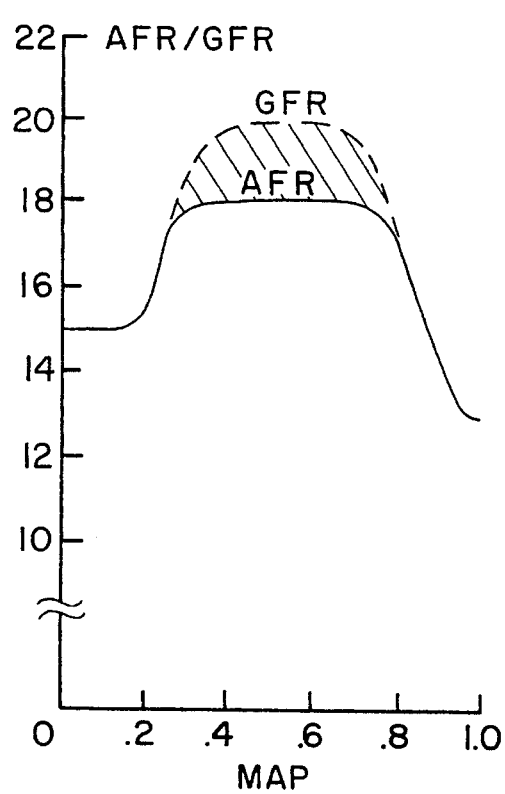

FIG. 1d corresponds to the case of FIG. 1c with EGR, and while not presently in use, has been reported in the literature and has been disclosed in my patent applications cited above. It represents a better compromise to the pure lean burn system of FIG. 1c. However, where experimentally used, it is only partially successful and does not represent an optimization based on engine operating characteristics as is the present invention.

As mentioned in the "background" section, the material disclosed in my patent application Ser. No. 07/854,074 includes detailed background material related to the present invention. It is noted that the above prior disclosure pertain to the present invention but are of limited validity to the detailed analysis disclosed herein to implement the optimization strategy which is now disclosed with reference to FIG. 2.

Figure 2:
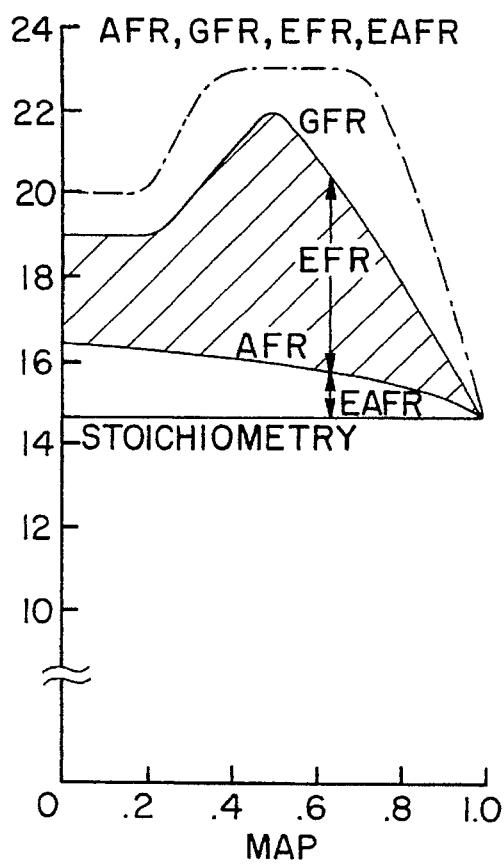
FIG. 2 represents an engine operating characteristic of AFR/GFR versus engine MAP for achieving the optimization of exhaust emissions, fuel economy, and power disclosed in the present application.

FIG. 2 depicts an "optimized engine characteristic", or "OEC" as it shall also be referred to hereinafter for short, for achieving optimization of emissions, fuel economy, and power. Its main features are:

1) the use of as high a GFR as practical at other than WOT, which for a preferred engine system (incorporating preferred VHE ignition) is approximately 19:1 at idle and approximately 23:1 at engine cruise conditions (defined as between approximately 0.3 to 0.7 MAP and 1800 RPM to 3600 RPM);

2) the addition of controlled amounts of exhaust gas to the incoming air such that: a) the air-fuel ratio is always at, or Just lean of, stoichiometry except at WOT where it may be slightly richer, and b) the addition of exhaust gas such that at low MAP values there is abundant oxygen to oxidize HC and CO and the EAFR is equal to about 1, i.e. 0.5 to 2, and near WOT where NOx tends to be high the AFR is stoichiometric, i.e. the EAFR is preferably about 0.5;

3) the further definition of the "optimized engine characteristic" as depicted in FIG. 2 and defined above such that it can be produced by means which are compatible with essentially normal engine operation.

Tables of values for generating an "optimized engine characteristic" are developed from the dilution equation derived below. These values are obtained from applying the dilution equation, which can be implemented by valving means shown in subsequent figures.

The analysis begins with the following general relationship which was intuited by study of the literature and by experimental observation:

$$dPex = C1ex*f(MAP)*(RPM)**2 \qquad (II)$$

where dpex represents the exhaust pressure above atmospheric at the exhaust manifold, Clex is a constant, * designates multiplication and "**" designates exponentiation. The functional form (MAP) is a term that depends on MAP in a way to be discussed with reference to FIG. 2a.

Figure 2A:
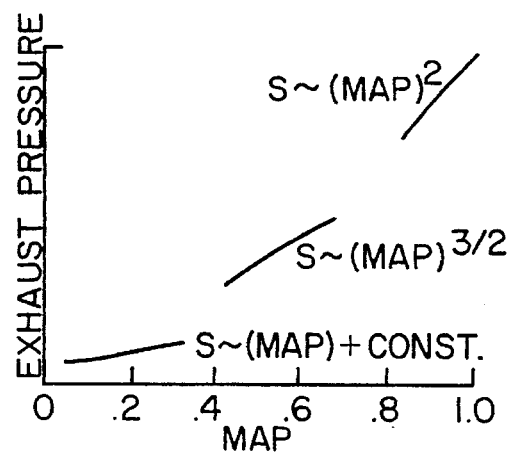
FIG. 2a depicts a typical relationship of exhaust pressure with MAP.
Figure 2B:
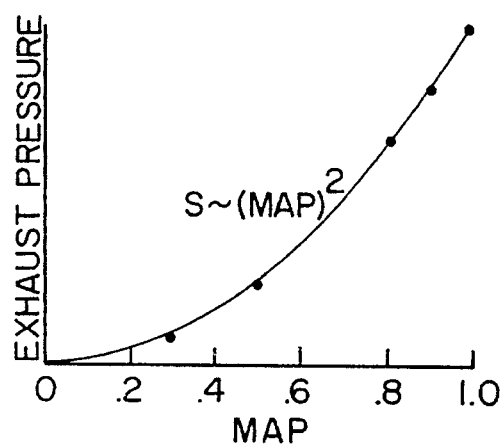
FIG. 2b shows an idealization which is used in the present analysis for deriving the dilution equation.

In FIG. 2a is shown a typical behavior of exhaust pressure in the exhaust manifold of a spark ignited four-stroke IC engine as a function of MAP value. The dependency on MAP varies from a linear dependence at idle conditions to a squared ((MAP)**2) dependence at high speeds and loads, where the term "S" in the figure represents the "slope" (the RPM dependence is approximately a squared dependence except at low MAP values (idle speeds) but for the present purposes can be taken as a simple squared dependence). But in the development of the optimization strategy the strictest requirement is in keeping EAFR close to zero at high MAP. At low MAP values some excess oxygen is preferred, and therefore there is less stringent requirements in estimating EFR, and hence EAFR For these and other reasons, the squared functional form shown in FIG. 2b is chosen for f(MAP). For the present analysis, the general functional form f(MAP) is retained.

For an exhaust gas dilution (EGD) tube connected between the exhaust manifold and air-intake, the exhaust gas mass flow rate Fex is given by:

$$Fex = C2ex*(Aex)*SQRT(dPex) \qquad (III)$$

where C2ex is a constant, Aex is the cross-section of the tube orifice cross-sectional area, and SQRT represents the square-root. The above follows from the Bernoulli equation and the continuity equation with the assumption that the orifice opening area Aex is much less than the EGD tube cross-sectional area.

Combining the above two equations, there is obtained for the exhaust flow rate, or the rate of delivery of exhaust gas into the intake manifold:

$$Fex = C3ex*(Aex)*(RPM)*SQRT[f(MAP)] \qquad (IV)$$

But the total intake air-flow rate Fin, including exhaust, is simply related to the MAP and RPM according to:

$$Fin = C4in*(MAP)*(RPM) \qquad (V)$$

Dividing the above two equations gives:

$$(Fex/Fin) = C5*(Aex)*SQRT[f(MAP)]/MAP \qquad (VI)$$

But the ratio of the exhaust fuel ratio EFR to the gas fuel ratio GFR is given by the above ratio Fex/Fin, so that:

$$EFr = K*[Aex/Aex(0)]*GFR*SQRT[f(MAP)]/MAP \qquad (VII)$$

Implementing the squared dependence of f(MAP), gives:

$$EFR = K*[Aex/Aex(0)]*GFR(MAP) \qquad (I)$$

where Aex(0) denotes the maximum valve opening orifice area and is introduced as a normalizing factor, and K is a constant essentially independent of MAP and RPM which varies with engine type and EGD tube structure and orientation.

This is a key relationship for generating "optimized engine characteristics" as exemplified by FIG. 2, and Is referred to hereinafter as the "dilution equation". It shows EFR to be essentially independent of RPM and proportional to the orifice area Aex. The dependency on MAP is principally through the GFR dependence (written out in the equation, although it is generally understood).

By the use of a simple valve that opens in relationship to engine MAP through its OFR dependence, one can generate an optimized engine characteristic as exemplified by FIG. 2. To more fully understand the system as a whole, reference Is made to FIG. 3, which is a partial side-view schematic of an engine system highlighting those parts that relate to the present invention, and specifically to the parts necessary for implementing the dilution equation for achieving the optimization strategy.

Figure 3:
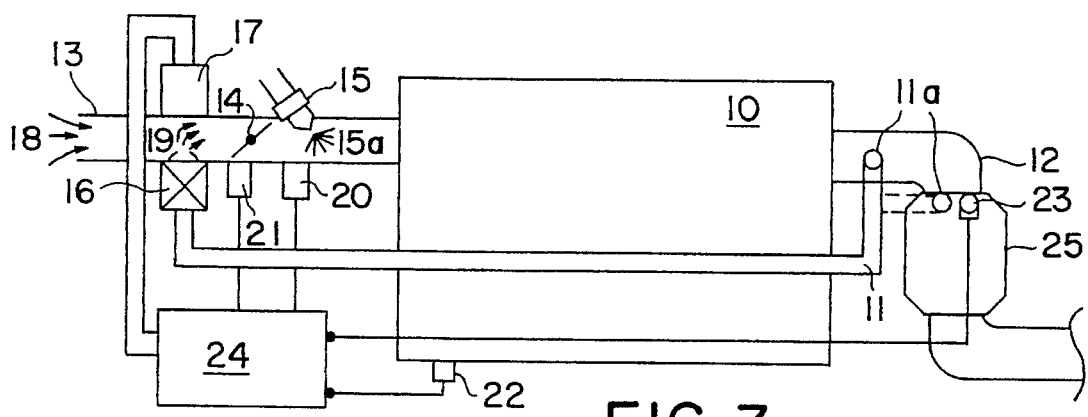
FIG. 3 is a partial side-view schematic of an engine system highlighting those parts that relate to the present invention, including components used for generating the optimization disclosed in the present invention.

Shown In FIG. 3 is an engine 10, an exhaust dilution tube 11 with a tap 11a into the exhaust manifold 12 (or at the front of a close-coupled catalyst 25), an intake manifold 13 with a throttle plate 14, a fuel introduction means 15 with fuel spray 15a, and a preferred embodiment dilution control device 16/17 for controlling the amount of exhaust diluent 19 in relationship to intake air 18. The dilution control device 16/17 is comprised of a valve means 16 (connected on the high pressure side of throttle 14 to the dilution tube 11 for defining an exhaust feed aperture or orifice opening area Aex for controlling the amount of exhaust diluent) and of a motor 17 for operating the valve means 16 as a function of MAP value as measured by the MAP sensor 20.

Also shown in the figure are air temperature 21 and engine coolant temperature 22 sensors, and air-fuel measuring sensor 23, e.g. lambda sensor, which may be used in conjunction with the dilution control device 16/17 via a controller means 24. Preferably close-coupled exhaust catalyst means 25 is used in conjunction with the overall optimization system.

Figure 4A:
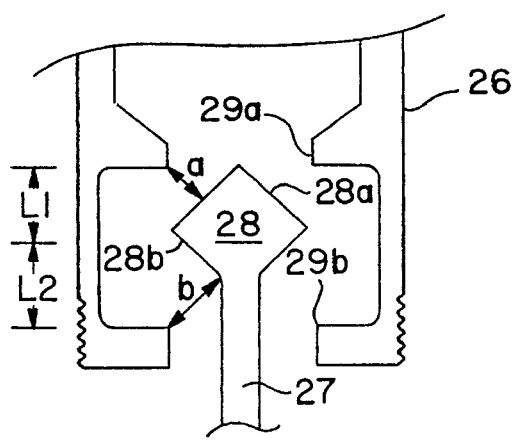
FIG. 4a is a valve means for producing the simple orifice opening shown in FIG. 4b according to the dilution equation in response to the GFR curve shown in FIG. 4b for realizing the optimization strategy.

A simple valve structure for realizing an approximation to the optimization strategy is depicted in FIG.4a, which is a linear "two-stage" valve with valve body 26 whose valve stem 27 moves linearly with MAP, i.e. linearly with the voltage output of a typical automotive MAP sensor, to define a typical valve opening versus MAP curve which is linearly dependent on MAP over two ranges of MAP about a value MAP1. The linear motion of the valve stem 27 produces the valve opening orifice "a" between the surface 28a of valve tip 28 and the valve opening edge 29a over a length L1 for MAP values from 0 to MAP1 as per FIG. 4b, and a valve closing orifice "b" between the surface 28b of valve tip 28 and the valve closing edge 29b over a length L2 for MAP values above MAP1, all in proportion to MAP over their respective ranges. This linear motion in proportion to the MAP value produces the following simple normalized area Aex/Aex(0) relationships:

Aex/Aex(0)=(MAP)/MAP0, for MAP between 0 and MAP1,

Aex/Aex(0)=(1-MAP)/MAP0, for MAP values greater than MAP1, where MAP0 is the maximum of (MAP), a normalization factor.

Figure 4B:
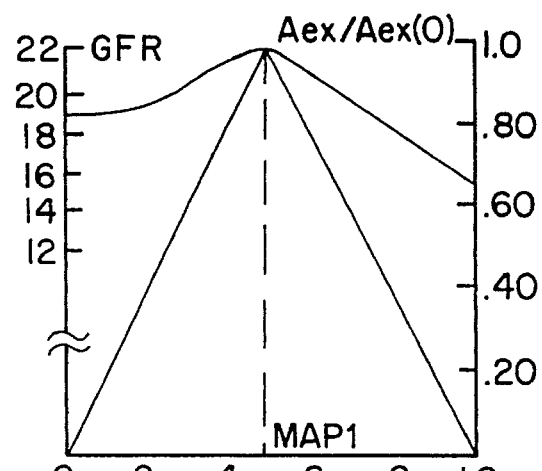

The curve, i.e. the triangular distribution, represented by the above equations is shown in FIG. 4b along with the GFR contour with which it is defined. In this example the simplest assumption is made, namely that the valve opens and closes at the same rate symmetrically about the mid-range point of MAP, i.e. MAP=MAP1=0.5, although MAP1 is preferably between approximately 0.6 and 0.8. This gives:

EFR=K*[(MAP)/MAP0]*[GFR], for MAP less than MAP1,

EFR=K*[(1-MAP)/MAP0]*[GFR], for MAP greater than MAP1.

Next are given values of EFR and AFR based on the above relationships assuming K=0.3, MAP1=0.5, and for the assumed GFR values (contour) given below corresponding to the OEC case shown in FIG. 2. The GFR contour was selected to be compatible with the present simple example, i.e. the GFR curve was interpolated with respect to the simple valve relationship to produce a result approximately consistent with the optimization strategy.

| MAP: | .2 | .3 | .4 | .5 | .6 | .7 | .8 | .9 | 1.0 |
|---|---|---|---|---|---|---|---|---|---|
| GFR: | 19 | 20 | 21 | 22 | 21 | 19.5 | 18 | 16.5 | 15 |
| MAP: | .2 | .3 | .4 | .5 | | | | | |
| 1-MAP: | | | | | .4 | .3 | .2 | .1 | 0 |
| Aex/Aex(0): | .4 | .6 | .8 | 1.0 | .8 | .6 | .4 | .2 | 0 |
| EFR: | 2.3 | 3.6 | 5.0 | 6.6 | 5.0 | 3.5 | 2.2 | 1.0 | 0 |
| AFR: | 16.7 | 16.4 | 16.0 | 15.4 | 16.0 | 16.0 | 15.8 | 15.5 | 15.0 |

The above table of values corresponding to the curves shown in FIG. 2 satisfy approximately the optimization strategy for AFR as a function of MAP. The AFR curve shown in FIG. 2 has been smoothed to provide an approximately best fitting curve of the AFR points from the above table, as would be expected in a practical case. Up to a MAP value of 0.4 the AFR is in the range of 16.0 to 16.7, and above 0.5 the AFR is in the range of 14.6 to 16.0, loosely meeting the requirements set by the optimization strategy.

As stated, the GFR curve in the above example was chosen to be compatible with the very simple form of Aex curve. A better GFR curve, and hence better OEC characteristic, is shown by the dash/dot curve of FIG. 2. To achieve this GFR curve a better engine/ignition system is required, and to achieve the desired OEC curve a somewhat more complex valve system is required.

Figure 5A:
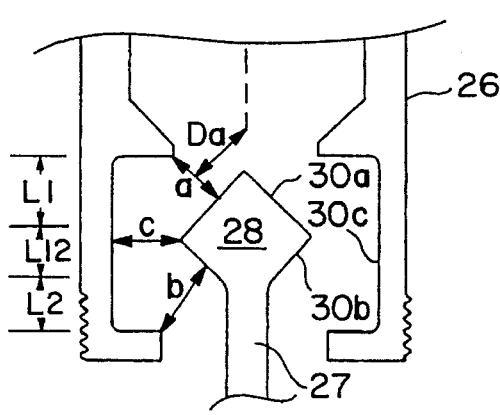
FIG. 5a is a valve means for producing the orifice opening area shown in FIG. 5b according to the dilution equation in response to the GFR curve shown in FIG. 5b for realizing the optimization strategy.
Figure 5B:
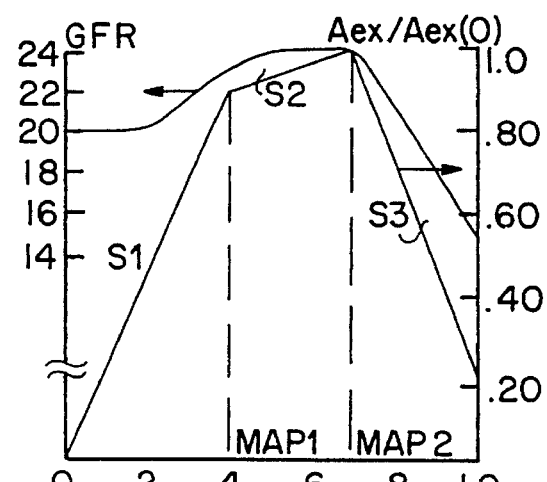

The valve shown in FIG. 5a can produce the motion required for the improved GFR dash-dot curve of FIG. 2, also shown in FIG. 5b. The curve is characterized by three slopes, an initial opening slope S1 ranging between 0 and MAP1, where MAP1 corresponds to the first approximately maximum value of GFR, an intermediate more gradual slope S2 ranging between MAP1 and MAP2, where MAP2 corresponds to the maximum GFR value, and a terminating faster dropping slope S3 between MAP2 and WOT. In FIG. 5b is shown both the preferred GFR curve and the three valve opening curves with slopes S1, S2, S3, with their respective slopes generating the normalized valve opening area Aex/Aex(0) as a function of MAP.

In this preferred valve embodiment the three different slopes are achieved by having two different shapes or angles 30a and 30b on the valve tip 28 for the initial slope S1 and the terminating slope S3 respectively, and a taper 30c on the interior surface of the valve body 26 for the intermediate slope S2. The maximum of the aperture opening "a" is chosen to correspond to the minimum of the aperture opening "c" (located at the L1/L12 intersection) so that during the valve motion corresponding to the length L12 the taper 30c determines the minimum orifice opening. The area of the opening is clearly approximately equal to pi*Dc*c, where Dc corresponds to the opening average diameter of the orifice, and "pi" is equal to 3.142. Likewise, for the valve opening "a" and "b" there are corresponding average diameters Da and Db from which are calculated the opening respective areas.

Below are given values of EFR and AFR based on the above relationships assuming K=0.36, MAP1=0.4, MAP2=

0.7, and for the assumed GFR contour (values) given below:

| MAP: | .2 | .3 | .4 | .5 | .6 | .7 | .8 | .9 | 1.0 |
|---|---|---|---|---|---|---|---|---|---|
| GFR: | 20 | 21.5 | 23 | 23.5 | 24 | 24 | 21 | 18 | 15.5 |
| Aex/Aex(0): | .46 | .67 | .90 | .93 | .97 | 1.0 | .74 | .46 | .2 |
| EFR: | 3.3 | 5.2 | 7.4 | 7.9 | 8.4 | 8.6 | 5.6 | 3.0 | 1.1 |
| AFR: | 16.7 | 16.3 | 15.6 | 15.6 | 15.6 | 15.4 | 15.4 | 15.0 | 14.4 |

For MAP values of 0.4(MAP1) and above, AFR is in the range of 14.4 to 15.4, fulfilling the requirements of the optimization strategy. Furthermore, the values are within one AFR of stoichiometric, which makes closed-loop control with a lambda sensor very effective (as discussed with reference to FIG. 7).

Figure 6:
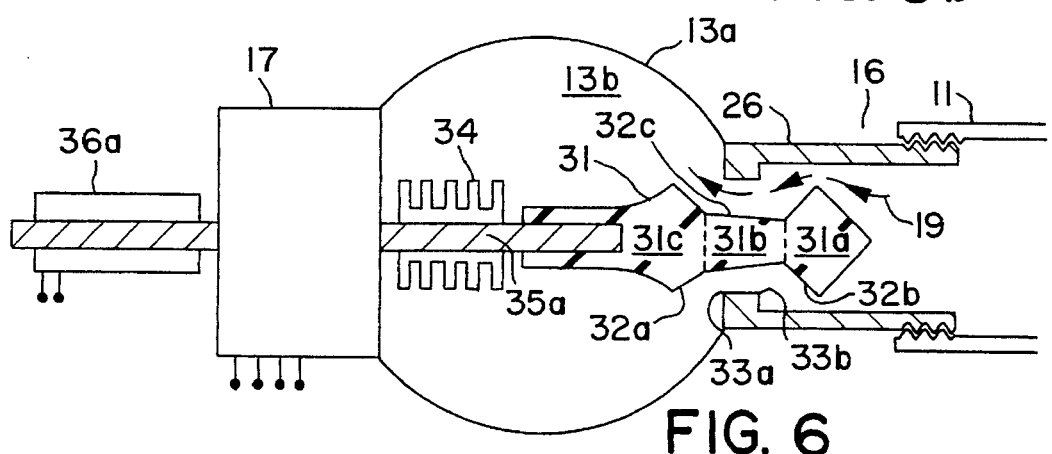
FIG. 6 is an approximately to-scale, partial schematic top-view cross-section drawing of a preferred embodiment of a system comprised of a linear stepper motor and linear two stage valve for mounting on the air-intake of an engine for implementing the dilution equation to realize the optimization strategy.

FIG. 6 depicts in partially schematic form an approximately to-scale top view cross-sectional drawing of a dilution control device 16/17 comprised of cylindrical section frame 13a for mounting on the air intake 13 of an engine (10), including a valve 16 with valve body 26 to which is mounted the EGD tube 11, a movable linear valve element 31, a stepper motor 17, and a linear potentio-meter 36a for monitoring the position of the valve element 31. This type of servo control using a potentiometer to monitor and, in turn, control position is known to those versed in the art of servo controlled stepper motors.

The valve element 31 is comprised of a valve tip 31a, a vane mid-section 1b, and a valve base 31c. In the low MAP closed position, sealing surface 32a of valve base 31c seals against outside rim edge 33a of the valve body, and valve surface 32a defines the opening slope S1 (FIG. 5b). Valve element surface 32c defines the slow changing orifice area of slope S2 (FIG. 5b). In the high MAP closed position, sealing surface 32b of valve tip 31a seals against inside rim edge 33b of the valve body, and valve surface 32b defines the closing slope S3 (FIG. 5b). Thus, by moving the valve element 31 linearly with MAP, a suitable area Aex/Aex(0) variation with MAP is attained to control the exhaust flow 19 into the air intake chamber 13b. Preferably linear shaft 35a of linear stepper motor 17 is heat insulated from valve element 31, and preferable has cooling-fins element 34 mounted on it for cooling by the intake air to keep motor 17 cool. By having positioned the motor diametrically across the valve orifice minimum heating of the motor by the exhaust gas 19 takes place.

FIG. 7 is a combination drawing of a circuit schematic comprising three comparators with a partially schematic approximately two-thirds scale side-view cross-sectional drawing of a dilution control device comprised of a cylindrical section frame 13a for mounting on the air intake 13, including a rotary valve element 37 with a suitably contoured surface 37a covering the exhaust gas entry port 11b of the EGD tube 11, a stepper motor 17 which is mounted in the interior section 13b of the frame 13a for air cooling, a (rotary) potentiometer 36b for monitoring the position of the valve element 37, and a controller chip 38 controlled by the three comparator (40a, 40b, 40c) circuit.

In this embodiment the surface 37a is contoured with respect to the entry port 11b to provide approximately the desired area Aex/Aex(0) variation with MAP as the motor rotates the valve element 37 (connected to the rotary motor shaft 35b) in relation to MAP value. A control system to produce the contour of FIG. 4b is shown which uses a control chip 38, such as a Hurst 220001, which has the inputs, a "Run" input (actually "Not-Run" which produces motion at a low logic level) and a "Clockwise (CW)/Counterclockwise (CCW)" input to control direction of rotation. This control system applies equally well to the system of FIG. 6 although the range of stepper motor rotation is much larger in that case.

A table that describes the control strategy (based on FIG. 4b) is given in FIG. 7a, where Vp is the voltage of potentiometer 36b(which is proportional to rotation angle), Vm is the voltage output of the MAP sensor 20, Vlm is the voltage output of the lambda sensor that ranges between zero and one volt depending on whether the AFR is lean or rich of stoichiometry respectively, and V1 is a voltage level below one volt, e.g. in the range of approximately 0.25 to 0.5 volts. FIG. 7b depicts the typical MAP voltage variation, V(MAP) or Vm, with MAP value, and the desired AFR contour (level of EAFR) as a function of MAP.

Comparator 40a determines the direction (CW or CCW). Comparators 40b and 40c are designed to provide unidirectional closed loop control with a lambda sensor 23 for MAP values above MAP1 by preventing the AFR from becoming too rich due to excess exhaust gas dilution. Comparator 40c has an output above one volt (voltage V') for Vm less than VM1 (VM1 is the voltage corresponding to MAP1), disabling lambda sensor operation (output of comparator 40b is high irrespective of AFR). For Vm greater than VM1 a voltage V1 of about 0.4 volts is placed at the non-inverting input of comparator 40b, enabling the lambda sensor (connected to the inverting input of 40b) to control the motor operation and hence the AFR to stoichiometry or lean of stoichiometry and override the other controls. Voltage V1 is made up of the sum of the "low" condition of the output voltage of comparator 40c(typically between 0.05 and 0.2 volts) and the voltage of about 0.3 volts of divider R/R1 connected to V'(giving 0.3 volts for V'=5 volts, R1=15 kohms, R=1 kohm).

The unidirectional control by the lambda sensor can be made effectively bi-directional by designing the valve such that under the servo control of the potentiometer 36b the AFR is slightly rich-of-stoichiometry so that the lambda sensor control will move the valve to a lean AFR, and in turn the potentiometer servo control will move it back to rich of stoichiometry, to produce oscillations around stoichiometry to enhance exhaust catalyst (25) operation. The "slightly rich-of-stoichiometry" can be achieved by increasing the value of the constant K in the dilution equation, i.e. by increasing K from 0.36 to 0.42 in the previous table to increase the valve opening area Aex(0) by 15%, values of AFR just rich of stoichiometry are attained, i.e. 14.0 to 14.5 AFR for MAP values above 0.4.

It should be noted that the above controller Is one specific controller which uses low cost parts (one quad-comparator) and a commercial step-motor controller 38. A flexible design could use a microprocessor chip to provide more sophisticated control schemes and an overall lower cost design, which could include the other sensors, e.g. coolant 22 and air temperature 21 sensors, as is done in a electronic fuel injection control systems currently in use. Since the exhaust dilution flow increases with engine temperature this could be taken into account (along with other variables) in a microprocessor based controller.

The exhaust dilution control lean burn systems, or DCLB systems, disclosed herein are especially applicable to older carburetor cars which do not have closed loop fuel control. By re-Jetting the carburetor to operate as lean as practical (except at WOT), the DCLB systems can then be used to make-up part or essentially all of the excess air and maintain closed-loop operation through variation of exhaust dilution responsive to lambda sensor as disclosed above.

For newer cars with closed-loop fuel control operation such DCLB system closed-loop operation represents a redundancy. There are ways to usefully employ the redundancy, but a potentially more useful alternative is to use a sensor sensitive to engine stability in place of the lambda sensor of the DCLB system. For example, by employing a sensor which measures torque fluctuation, or the coefficient of variation (COV) of torque fluctuation, and simple electronics that provides a low output for acceptable COV (say up to 5%) and a high output for too high COV (say above 5%), then a similar control strategy to that depicted in FIG. 7 can be employed except that the lambda sensor connection is made instead to the COV connection. In this way the DCLB system can be made to provide maximum controlled dilution for best engine (GFR) operation as defined by the closed loop fuel control system and other systems used in modem cars, making adjustments in the level of dilution with COV for reducing exhaust dilution when COV is high and vice-versa.

With reference to FIGS. 6 and 7 one can develop a hybrid system incorporating the diametrically opposed drive and valve of FIG. 6 with a rotary gate valve type motion of FIG. 7, which among other things will provide for a simpler overall valve design and a faster response rate than that of FIG. 6.

This is accomplished by replacing the linear valve 16 with a rotary gate type valves 41 or 43 as per FIGS. 8a and 8b respectively, which rotate about the shaft 35a essentially 180 to 360 degrees respectively to cover and uncover the exhaust gas entry port 11b. The shaft 35a in this case is a rotary shaft with eccentric plates 41 or 43 shaped to cover and uncover port 11b to provide the required opening area Aex with MAP value. The cut-out 42 of plate 41, FIG. 8a, is shaped to provide the required opening area Aex as the plate is rotated from zero MAP value to a maximum opening at mid-MAP values to the closed position at WOT. The elliptical gate valve 43 of FIG. 8b provides the additional advantage that it defines its complete motion in approximately 360 degrees or less, and by adjusting the major diameter "D" of the ellipse can be made to have its angular range correspond to the approximately 300 degrees range of a conventional rotary potentiometer (with the included angle "theta" shown to correspond to approximately 60 degrees in this case). This simplifies the control implementation of FIG. 7 with respect to use of a conventional rotary potentiometer.

It should be noted that with respect to FIGS. 8a and 8b there will be some clearance between the gate valves 41 and 43 and the orifice opening 11b to define the area Aex/Aex(0) versus MAP distributions of FIG. 8c (the dashed curve corresponding to FIG. 8a and the solid curve to FIG. 8b). In this case, the area Aex does not go to zero at MAP of zero and WOT. This is of little significance since the actual further dilution at the realistic minimum MAP values of approximately 0.2 MAP at idle is insignificant, and the added dilution at WOT will be insignificant (i.e. can be less than the internal residual due to valve overlap). In this respect, it should be noted that in the disclosure with respect to previous valve designs, the valves do not have to be seated or closed at the two limits of zero MAP and WOT.

With respect to FIG. 8c, which represents opening area Aex distributions similar to that of the preferred distribution of FIG. 5b, note that the distribution is approximately half a sine function or a rounded symmetrical trapezoid with a large range of MAP values, e.g. ⅓ the range, over which the opening area is near its maximum. By tailoring the shapes of the gate valves, especially the end edges, the desired opening and closing distribution can be attained.

The rounded top of the area distribution of FIG. 8c can be made flat (into a trapezoidal distribution with curved legs) by limiting the maximum exhaust flow in the EGD tube at some other point than at the orifice opening, e.g. by including a manual in-line valve in the EGD tube that can be set. This also allows for fewer parts associated with the overall EGD tube and valve designs to accommodate a wide range of car applications (where the maximum opening area Aex(0) is set by the manual in-line valve).

It is recognized that if the valve opening and closing slopes are the same, as per FIG. 4b, then a single ended or single acting valve may be used in place of the double acting ones of FIGS. 4a, 5a, 6. In that case, the valve stem would move in one direction up to a MAP value MAP1 and then reverse direction with increasing MAP values.

The optimization strategy and valve control system designs, i.e. size and shape, are independent of means of measuring air flow, i.e. whether a MAP sensor and RPM are used to indicate air-flow, or a mass air-flow sensor is used. However, engine size, EGD tube dimensions and orientation, and exhaust system back pressure (determined by the restriction imposed by the catalyst, exhaust tubes, and muffler) determine the actual size of the valve body or orifice opening to reflect the desired value of the constant K in the dilution equation. Note that, as discussed above, greater flexibility in the valve size can be attained by including an in-line valve which is set to correspond to the constant K. Typically, the valve will have an inner dimension (ID) ranging between 0.5 and 1.5 inch depending on the type of valve used and car. The gate valves of FIGS. 8a and 8b make optimal use of the orifice opening and require a smaller opening than the valves of FIGS. 4a, 5a, and 6.

It is noted that a lean sensor can be used in place of a lambda sensor, or a combination of the two sensors for more sophisticated control of the valve, especially in combination with a closed-loop fuel control system, as disclosed. The EGD tube 11 may have two taps, one connecting to the fixed orifice and one connecting to the valved orifice. Also other forms of valves and valve motion can be used to accomplish the objectives of the optimization strategy.

For example, a purely mechanical device can be used to approximately achieve the optimization strategy. A rotary valve can be placed in the EGD tube end 11a, rotatable by 180 degrees by the throttle 14 to which is mechanically connected or linked, to introduce low levels of exhaust gas at idle (flapper mostly closed), maximum exhaust at moderate load (flapper totally open), and minimum to no exhaust gas at WOT (flapper essentially closed).

With respect to exhaust catalyst design, for the present application which tends to produce somewhat higher HC emissions at cruise conditions but lower CO and NOx emissions under most conditions and lower exhaust temperatures (than a stoichiometric three-way system), a single catalyst close-coupled to the exhaust manifold, i.e. mounted against the exhaust manifold, is practical. A single unit catalyst, i.e. a single can, is preferred with one or two catalyst bricks or biscuits, one which may be of heavily loaded palladium for quick light-off and low cost (known to those versed in the art of catalyst design). The catalyst can be of length between 6 and 12 inches, mounted directly on the exhaust manifold with a heavy loading of palladium of about 150 gms/cubic foot. The EGD tube pickup 11a, as well as the lambda sensor 23, can be mounted on the catalyst can, preferably at the front of the can, making for a compact retrofit system.

Note that the preferred high level of exhaust gas dilution reduces the exhaust back pressure and therefore reduces the otherwise higher exhaust pumping loss accompanying the present high GFR (lean burn) strategy and thus maintains the high engine efficiency of a lean burn engine. On the other hand, to enhance catalyst light-off exhaust dilution may be cut-off immediately following engine start-up or at low coolant temperatures to increase exhaust pressure and temperature at the catalyst for quick light-off.

For the present application where as high residual as practical is used, it is found that a Lambda sensor that skews the AFR slightly lean of stoichio-metry is preferred for fuel control. For example, assuming that the sensor controller corrects at a rate R (of say −20%/second) when the sensor indicates rich, then a slower rate of about 0.6*R (about +12%/second) is preferred when the sensor indicates lean, which skews the AFR to slightly lean of stoichiometry. The degree of skewing appears to be related to the level of EFR (and GFR) employed.

In retrofit applications of older cars where a catalyst is preferred as part of the overall DCLB system, problems may be encountered due to valve recessing with the switch to unleaded fuel. Valve recessing is aggravated by high exhaust temperatures and hard running of the engine. To alleviate this problem closed-loop stoichiometric operation with a low level of dilution may be used at WOT to limit peak exhaust temperatures.

For new cars with fuel control, a useful fuel injection timing control is one where fuel injection is timed to occur at the end of the Ignition dwell time, as in the dwell of a conventional ignition timing, for timing the injection pulses relatively to the ignition timing (appropriately shifted so the fuel injection occurs from prior to and up to after the intake valve opening).

A flexible controller design is one based on a microprocessor chip. An embodiment for achieving the DCLB strategy is to use a microprocessor based system as it is used by those knowledgeable in the art of engine controls, that employs, for example, a look-up table or map for setting AFR and for achieving closed-loop control of AFR at stotehiometry by controlling the mount of fuel injected through Lambda sensor means. In one embodiment, a microprocessor with an Inexpensive 8-bit analog to digital, A/D, converter can be programmed to monitor the MAP voltage and use a look-up table in Its program to determine the number of steps to give a stepping motor, CW or CCW, in order to rotate a valve element to the desired position for the desired GFR of the DCLB strategy. The microprocessor can identify the valve position by monitoring a position sensor attached to the shaft of the valve, e.g. a potentiometer with a regulated five volts impressed across it, or by other means. The microprocessor can then use the output of a Lambda sensor or engine stability sensor to maintain closed-loop operation around stoichiometry over a range of MAP values as desired.

In such a design employing a look-up table, the look-up table can be a two dimensional curve of valve position or valve opening area Aex as a function of MAP, as In for example FIGS. 4b, 5b, 8c, or it can be any complex shape for the valve opening area with MAP, which can be experimentally determined for every engine type by performing engine testing or through a self-learning process, referred to henceforth as a "density dilution map".

Alternatively, such a design can mimic a three dimensional "speed-density map" in which the fuel injection time is specified by a, say, 16 times 16grid of 16 MAP points (from MAP of $1/16$ to MAP of 1.0) and 16 speed points which increment in 400 RPM increments. In this case, the exhaust dilution valve opening position replaces the fuel injection opening time and the dilution equation is not relied upon to program the "speed-density dilution map" as it shall be referred to henceforth. Instead, the map can be experimentally programmed as discussed above. As in the case of modern fuel control systems, the map is supplemented by air and water coolant temperature corrections to the map, as well as other corrections such as engine start up corrections.

It is emphasized that as with microprocessor based fuel control systems, the map is preferably corrected and overridden by use of a Lambda sensor (or other sensor such as an engine stability sensor) which takes the system into a closed-loop condition at stoichiometric AFR after the Lambda sensor has warmed up. As stated earlier, in the case where the above "speed-density dilution map", or the more simple "density dilution map", is used with a closed loop fuel control system employing a Lambda sensor, then a Lambda sensor based closed-loop fuel control of the speed-density dilution map is a redundancy, as discussed earlier, and an engine stability sensor based closed-loop dilution control strategy may be preferred for the speed-density dilution map.

It is noted that in microprocessor based dilution control system the flexibility afforded by the programming of the chip implies that the valve itself can be very simple and convenient, versus the case of FIG. 5a, for example, where the valve is contoured to provide the proper level of dilution with MAP.

It is further noted that the Lambda sensor based closed-loop dilution control systems disclosed herein may be particularly suited for older cars using carburetors not easily converted to stoichiometric closed-loop fuel control and for vaporization type fuel mixing systems which improve combustion and minimize hydrocarbon emissions but which are not amenable to precise control of the fuel (and hence satisfactory stoichiometric closed loop operation). Also, in place of look-up tables functional relationships can be used to specify the valve opening which can then be customized to specific engine types.

Up to this point certain simplifications and approximations have been made to introduce the new strategy and control system for engine dilution. From this disclosure, and other recent developments, can now be defined "the optimized engine" based on our current understanding.

Figure 9:
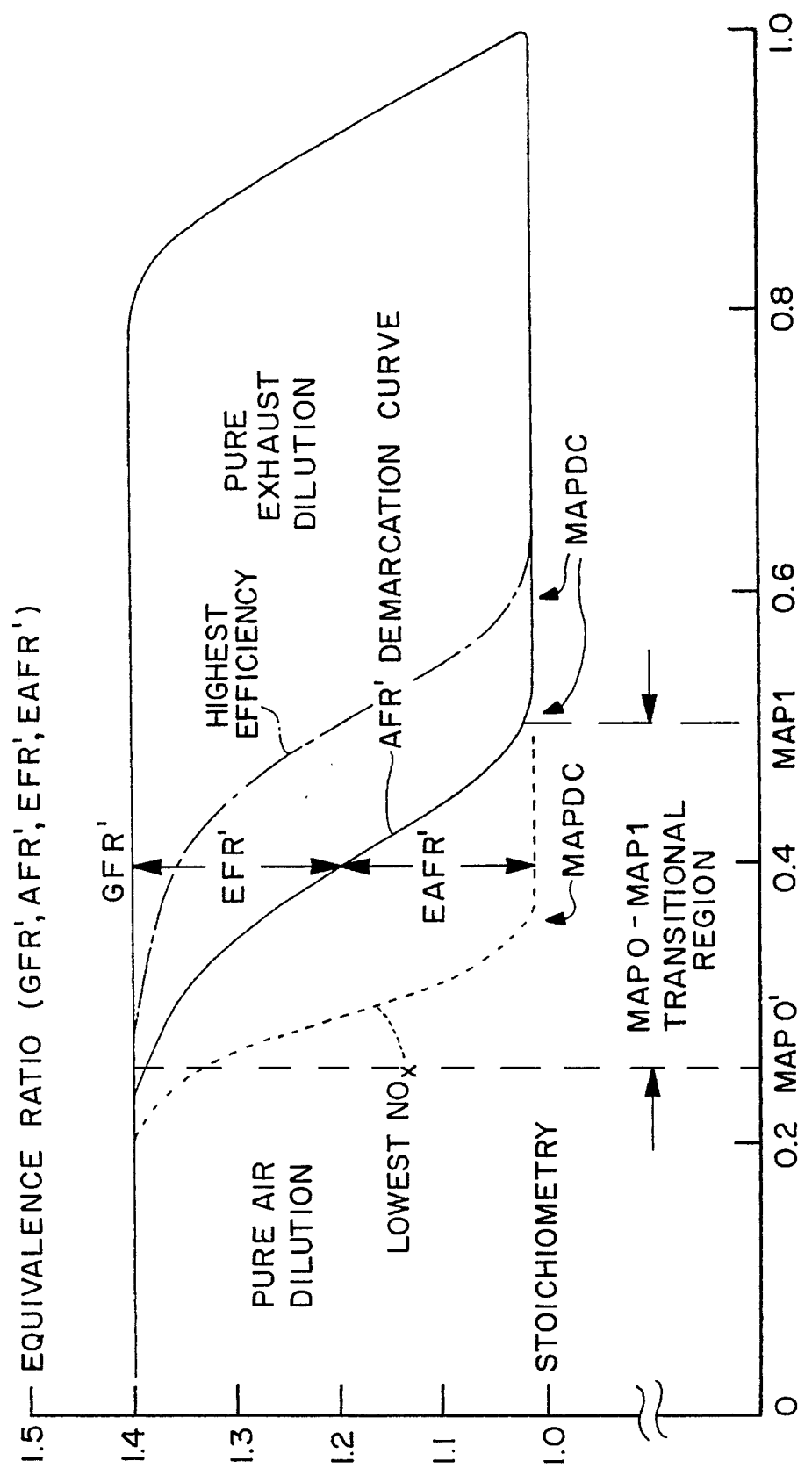
FIG. 9 depicts a graph of an optimized air/exhaust dilution strategy for achieving a minimum of fuel consumption and NOx emissions.

The optimized engine is an engine that has the following characteristics:

1) fuel metering and mixing with the incoming air-exhaust gas component is precisely controlled and optimized (by means, for example, of electronically controlled air-blast multi-port fuel injectors);

2) fuel injection timing is controlled so that at light loads a homogeneous mixture is used and at higher loads a homogeneous with a slightly reversed stratified mixture is produced (by injecting fuel at, say, approximately 90 crank angle (CA) degrees before intake valve opening to give the early injected fuel a long residence time and to form a slightly reverse stratification with the later injected fuel at higher loads where the injection time is approximately 90 degrees CA or greater);

3) a very powerful (hundreds of watts spark power), high energy electronically (timing) controlled ignition of variable spark duration (long duration at lower, e.g.

idle, speeds) and intensity is used to allow ignition of a highly diluted mixtures;

4) high turbulence engine is used (e.g. with swirl or tumble motion) with increased turbulent intensity at low speeds for improved idle combustion stability and with preferably variable cam timing with minimum cam overlap (to say approximately 20 degrees CA) to minimize residual (internal exhaust dilution) and maximize idle and low speed stability;

5) full electronic engine control using air, water, and oil temperature sensors, MAP and speed sensors, lambda (and/or AFP0 sensors, throttle position sensor, and other newly emerging sensors such as engine stability (coefficient of variation, COV) sensors, NOx sensors, etc.;

6) fast warm-up (exhaust manifold mounted) catalyst and heat retention system;

7) a dilution system as defined in FIG. 9 wherein GFR is maximized and made approximately constant with MAP up to MAP of approximately 0.8 whereafter GFR drops to stoichiometry or slightly above at MAP of 1.0, and wherein at light load the dilution is essentially entirely by air and at higher loads dilution is essentially entirely with exhaust gas.

The optimized engine characteristics enumerated allow for: 1) high dilution with mostly air at light loads where efficiency robbing engine pumping loss is highest (air dilution is more tolerated by the engine than exhaust dilution to give the maximum level of dilution); 2) essentially entirely all exhaust dilution at higher loads where NOx is highest (the engine is more dilution tolerant at higher loads and the accompanying generally higher speeds); 3) a shift from essentially pure air-dilution to pure exhaust-dilution at intermediary MAP values between idle and MAP1 or higher, determined by the level of NOx that can be tolerated.

In FIG. 9 the GFR'(primed means normalized to stoichiometry) shifts from pure air dilution at a MAP value of MAP0'(idle condition) to pure exhaust dilution at a MAP value of MAPDC (shown to coincide with MAP1) according to the (solid) AFR'curve (from which EFR'and EAFR'are defined); the region MAPO'to MAPDC is defined as the "transitional region". If higher NOx can be tolerated the EFR'/EAFR', or AFR'demarcation curve can be shifted to higher MAP values (MAPDC shifts from approximately 0.5 to 0.6, the dash-dot curve) with a higher overall GFR'level (not shown), giving higher engine efficiency; for lower NOx the demarcation is shifted to lower map values (MAPDC shifts from 0.5 to 0.35, the dotted curve with narrow transitional region). In the simplest approximation the dilution GFR'curve is set to be independent of speed and load as shown in the figure, but more realistically because of the engine's higher tolerance for dilution at higher speeds and loads the GFR'curve will be shifted to higher values with engine speed and load (up to some maximum engine speed and load).

A simple means of approximately achieving the result of FIG. 9 for an otherwise optimized engine is given by the control circuitry and truth table in FIGS. 10a to 10d. The description of the figures is functionally simple and can be more optimally and flexibly be achieved by the use of microprocessor controls as already disclosed. Unlike FIG. 7 which shows a simplified controller where the step motor is always on (the "NOT RUN" terminal being grounded) and lambda sensor control is set for only the higher MAP values (MAP greater than M1), the present controller includes engine start up features, step motor shut-off at engine idle, dilution variation with engine speed, and generalized sensor control (lambda, COV, NOx, or other sensor) for both MAP regions (MAP less and greater and M1).

To better understand operation of the more optimized controller of FIGS. 10a to 10d, the discussion with reference to FIGS. 2a, 2b is recalled, and specifically it is recalled that the functional dependence f(MAP) in equation II was approximated by MAP**2. The speed dependence was assumed, with little discussion, to also be a squared dependence. A better approximation is:

$$dPex=C1ex*(MAP)*(RPM) \ldots \text{for } MAP, RPM \text{ below } M1, N1 \quad \text{(IIA)}$$

$$dPex=C1ex*[(MAP)**2]*[(RPM)**2)] \ldots \text{for } MAP, RPM \text{ above } M1, N1 \quad \text{(IIb)}$$

where N1 equals the RPM value where the speed dependence changes from linear to squared (N1 varies with engine design but can be approximated as 2800 RPM).

These equations imply a linear dependence on speed and MAP for low MAP and speed values and a squared dependence for high MAP values, translating to a two-part dilution equation:

$$EFR=K*[Aex/Aex(0)]*GFR/SQRT(MAP*RPM) \text{ for } MAP, RPM \text{ below } M1, N1 \quad \text{(Ia)}$$

$$EFR=K*[Aex/Aex(0)]*GFR \ldots \text{ for } MAP, RPM \text{ aboe } M1, N1 \quad \text{(Ib)}$$

If we now define EFR0, GFR0 as normalized (generally maximum) values at M1, N1 which represent an approximately mid-MAP/speed (maximum exhaust dilution) point, then based on the above and the definition of Aex(0):

$$EFR/EFR0=[Aex/Aex(0)]*[GFR/GFR0]/SQRT(M*N), \text{ for } MAP, RPM \text{ below } M1, N1, \text{ where } M=MAP/M1, N=RPM/n1, \quad \text{(Ic)}$$

$$EFR0=K*GFR0, \text{ where } Aex/Aex(0)=1 \text{ for } M=N=1. \quad \text{(ID)}$$

Assuming GFR is approximately constant over the transitional region:

$$EFR=EFR0*[Aex/Aex(0)*|SQRT(M*N) \ldots \text{ for } MAP, RPM \text{ below } M1 N1 \quad \text{(VIII)}$$

$$Aex/Aex(0)=[EFR/EFR(0)*|SQRT(M*N) \ldots \text{ for } MAP, RPM \text{ below } M1, N1 \quad \text{(IX)}$$

It follows from equation (IX) that starting with the exhaust dilution valve at a base (small) opening, it then starts to open according to equation (IX) in proportion to the desired EFR and in proportion to the square roots of (MAP/M1) and (RPM/N1), over the transitional region, until a MAP value of MAP1 (which may be less than, greater than, or equal to MPDC as per FIG. 9). and then has a constant maximum opening area of Aex(0) (MAP1=MAPDC) until a MAP value of approximately 0.8 where the valve starts to rapidly close to essentially zero area (or slightly higher if some exhaust dilution is required). For MAP values at or above MAPDC lambda sensor based closed loop control is preferably operational.

We now have a more precise prescription for a more optimized operation of air/exhaust dilution of the engine for the best trade-off between emissions and efficiency. With that FIGS. 10a to 10c can be analyzed.

FIG. 10a comprises, as in FIG. 2, stepper motor 17 and control chip 38 with comparator 40a which determines the direction of the motor (CW or CCW). Direction control comparator 40a has the modified MAP voltage Vmap'(the actual MAP voltage Vmap with an in-series resistor R2) connected to one input and the potentiometer voltage Vpot (like numerals refer to like parts with respect to earlier figures) connected to the other input. Vmap and Vmap' are equal except when the comparator non-inverting control node 45 Is pulled low (by start-up comparator 44 or speed control circuit of FIG. 10b). Circuit comprised of comparator 44, resistors 44a and 44b, and capacitor 44e with a connection to the car's switched twelve volts (switched battery voltage SW 12v) pulls control node 45 low Vmap' low) during starting to insure that the dilution valve is shut during engine cranking (for a time determined by the circuit components and the voltages SW 12v and Vref0). The circuit comprised of comparators 46a, 46b, transistor 46c with a regulated voltage 5 volts shown) and pull-up resistor "r" connected to the comparator outputs which are connected to the "Not-Run" input of controller chip 38 insure that the step motor 17 in running when either Vmap' or Vpot are above a voltage Vidle representing the MAP voltage at idle speeds, and shut off and disabled (motor is switched off by transistor 46c which pulls the controller 38 "disable" point low) when the engine is idling and the valve position corresponds to the idle condition. This minimizes motor wear and power. In this configuration, the CW motion initiates valve opening, representing increased opening area Aex up to a MAP value of M1 (as per FIG. 4b) and then decreases area Aex with continuing increase of CW motion (based on the two-way valve motions disclosed).

FIG. 10b made up of comparators 47a, 47b with output resistors 47c and 47d connected to control node 45 are designed to close the valve in steps when the voltage Vspeed (a voltage proportional to speed) falls below the two reference voltages Vref1 and Vref2 in turn, to provide a simple two-point speed dependent valve closure (2200 and 1900 RPM shown) at low MAP values as per equation IX. The valve closure depends on the ratio of the output resistors 47c, 47d to R2.

In FIG. 10c comparator 40b and 40c and resistors R, R1 connected to regulated voltage source V'(5 volts shown) produce the same lambda sensor control function as in FIG. 7, with two differences. One is that the lambda sensor control is generalized to the generalized voltage control Vx (versus Vlm), where Vx can in addition represent COV, NOx, or other sensor voltage which would be low, e.g. below 0.5 volts, for low COV and high NOx representing good engine stability and tolerating further exhaust dilution, and high, e.g. 1.0 volts, for high COV and low NOx representing marginal engine stability. The second difference is that in this case the sensor is enabled for Vmap<VM1 (versus greater than) as per truth table of FIG. 10d showing CCW (valve closure) rotation for Vx>0.5 volts, and no effect for Vx less than 0.5 volts. Also, in this design the case of Vmap>VM1 is also handled, by comparators 40d, 40e, 40f with the exception that an inversion by transistor 40g is required since in this case it is the low Vx condition, i.e. Vx<0.5, that is controllable with no effect for Vx>0.5. With the present simple controller (versus a microprocessor controller), assuming lambda sensor control, for high MAP values more dilution is added for lean conditions, and vice versa for low MAP values (less dilution for rich conditions and no effect for lean conditions as per the strategy of FIG. 9 and the truth table of FIG. 10d). Comparator 40f insures that for Vmap>VM1, Vx<0.5, the motor valve is operated CCW (more dilution) until the valve position is at maximum dilution (the MAP1 condition), and then the CCW motion is terminated (hence the asterisk designation on the CCW indicator in FIG. 10d to indicate a limit on the CCW motion). This problem does not occur for Vmap<VM 1 since CCW motion produces continuous valve closure. Tranststor 40h insures that output transistor 40g is disabled for Vmap<VM 1 as required.

As previously disclosed, by use of a microprocessor one can implement the other two of four ranges of operation of the generalized sensor with output voltage Vx (the "no effect" regions as per FIG. 10d). However, even in this case, by the use of additional resistors, diodes, and comparators, one can implement a design which would produce active CW motion in the two current "no effect" regions by having the Vpot signal pulled down through a voltage divider. For the Vmap>Vm1 condition the pull-down can be a hard pull-down (completely shutting the valve for Vx>0.5, the overly rich overly diluted condition per lambda sensor signal).

With respect to the (variable) "demarcation point" designated as MAPDC as per FIG. 9, it is emphasized that this is the point where the shift in the intake gas composition is made to stoichiometry with essentially pure exhaust dilution. This point is not related to MAP1, the point (in reality a region) where the dilution equation changes from being approximately speed and MAP dependent to speed and MAP independent (which generally is the point of maximum valve opening). If, for example, a dilution strategy of constant GFR and EFR (up to a MAP value of MAP2) were implemented, then according to dilution equation (IX) the valve area Aex would still have to increase with MAP and speed up to the map and speed values MAP1 and N1 (based on the more complete two dilution equation set Ia and Ib).

Further with respect to the variable demarcation point MAPDC, this could be electronically adjustable by, say, input from an NOx sensor which would lower the point (to lower MAP values) to lower overall NOx emissions, and vice versa (but give higher engine efficiency). Likewise, the GFR level, i.e. the maximum dilution level, could be electronically adjustable in response to, say, a COV sensor (which could be a pressure transducer with some logic). For the case where significant exhaust dilution is used a light loads (for minimum NOx emissions) this could take the form of a second orifice which could represent a base orifice manually or electronically set through NOx, COV, or other sensor when the engine is operating at one or more previously defined baseline points, e.g. a warmed up engine running at 30 miles per hour (mph) on the highway (defined by a speed and MAP point or small region). Unless otherwise stated or specified, engine operation is assumed to mean a warmed-up engine in a car operating on a level road.

Other changes can be made without departing from the scope of the invention. It is particularly emphasized with regard to the present invention, that since certain changes may be made in the above apparatus and method without departing from the scope of the invention herein disclosed, it is intended that all matter contained in the above description, or shown in the accompanying drawings, shall be interpreted in an illustrative and not limiting sense.

What is claimed is:

1. An improved combustion engine comprising:
   (1) means defining at least one combustion chamber and expansion means powered by combustion therein to drive a rotary output of the engine, the output speed being defined as revolutions per minute, RPM;
   (2) means defining a main air intake zone with means for adding fuel thereto, the air intake zone leading to the combustion chamber for supplying air-fuel mixture thereto, the intake zone having a high pressure region in the air flow path to the combustion chamber and a low pressure region in said flow path downstream from the high pressure region, the two regions being separated by throttle means;

(3) means for controlling air-fuel ratio, AFR, of the mixture;

(4) means for discharging the combustion exhaust from the chamber to an exhaust zone (5) means for tapping a portion of exhaust gas from the exhaust zone and conveying the tapped gas via a conduit to the high pressure region of the intake zone to dilute intake air and establish a gas-fuel ratio, GFR, and exhaust-fuel ratio, EFR, where GFR=AFR+EFR, and AFR=AFRO+EAFR, where AFRO is stoichiometric air-fuel ratio and EAFR is the actual air-fuel ratio fed to the combustion chamber, less stoichiometric, i.e. excess air-fuel ratio, said means for tapping being constructed and arranged to provide a variable area Aex defining a variable exhaust cross section flow area between the point of tapping the exhaust zone and the point of delivery of tapped exhaust gas to the high pressure region of the intake zone, with a maximum value of Aex(0), and wherein, the engine further comprises control means that control the amount of exhaust gas tapped, and therefore the amount returned to the high pressure zone intake zone, to thereby establish EFR/GFR in relation to RPM and manifold absolute pressure of the low pressure region of the intake zone, MAP, in the following ways:

(a) means, responsive to engine speed and intake zone pressure, for introducing said tapped portion of the exhaust gas at the high pressure side of said intake zone according to the following two dilution equations, defined according to whether MAP and RPM are below or above respective pre-set control values of MAP, MAP1 and MAP2, and RPM N1 that are intermediate between extreme highs and lows of MAP and RPM at the extremes of engine operation of idling and wide open throttle, WOT,:

$$EFR/GFR=K(Aex/Aex(0))/SQRT(M*N) \quad (I)$$

where MAP and RPM are below the respective pre-set MAP1, N1, and where M=MAP1 and N=RPM/N1, and $$EFR/GFR=K(Aex/Aex(0)) \quad (II)$$

where MAP is between two preset control values thereof, the lower one of which is the MAP control value used in equation (I), MAP1, and the higher one MAP2, is below MAP at the WOT, condition and RPM is above the value thereof used for equation (I) above where K is a constant essentially independent of speed and MAP and which is related to the engine size, dimensions of said tapping means, exhaust system restriction and other engine parameters, and (b) means for maintaining the ratio EFR/GFR consistent with said dilution equations I and II under essentially all engine conditions, at a level providing variable dilution and engine stability to accordingly provide:

(A) as high GFR as the engine can tolerate efficiently at idle speed and corresponding MAP and at idle conditions of less than 1.5 times idle speed, (B) increasing exhaust dilution through variable tapped Aex as per dilution equations I and II for MAP values to up to a further control value of MAP, MAPDC to provide essentially stoichiometric air-fuel ratio for MAP values at and above MAPDC, (C) increasing exhaust dilution through variable tapped area Aex as per dilution equation I for speed, MAP conditions between idle and N1 MAP1, (D) essentially constant GFR, EFR, and area Aex for MAP between MAP1 and MAP2, where MAP2 is above MAP1 and is less than WOT, (E) decreasing tapped area Aex, and therefore decreasing EFR, between MAP2 and WOT so that EFR is reduced substantially from its maximum value, EFRO, at WOT.

2. The internal combustion engine system of claim 1 wherein said engine and control means are constructed and arranged to provide high engine efficiency and low NOx emissions with MAPDC and MAP2 set at approximately 0.35 and 0.8 atmospheres respectively.

3. The internal combustion engine system of claim 1 wherein said control means are further constructed and arranged so that M1 and N1 are set at approximately 0.5 (in units of atmospheres) and 2800 RPM respectively.

4. The internal combustion engine system of claim 1 wherein the engine is constructed and arranged to provide a gas fuel ratio, GFR, of 21:1 or greater, through a majority of the MAP range between MAP0 and MAP2.

5. The internal combustion engine system of claim 4 wherein MAPDC, MAP1, and MAP2 are approximately 0.35, 0.5, and 0.8 respectively.

6. The internal combustion engine system of claim 1 wherein said control means includes a motor driven exhaust dilution means including a valve located at the conduit end attached to the intake manifold for diluting the intake air with a variable level of exhaust gas said dilution governed by the dilution equations I and II said control means further employing an air-fuel ratio, AFR, sensor means for maintaining closed-loop feedback controlled engine operation at stoichiometry, AFRO, at a manifold absolute pressure (MAP) of MAPDC and above.

7. The apparatus of claim 6 wherein the valve comprises a drive located in a section of the intake manifold remote from the valve and coupled to it in a link crossing the manifold to afford intake air cooling of the drive and of the link.

8. The apparatus of claim 7 wherein the valve comprises a sealing valve element and a valve body or exhaust gas opening and said drive and link are constructed and arranged to move essentially in relationship with MAP value and to move said valve element, which is constructed with respect to the valve body to be two stage or double acting such that:

1) at zero MAP value a surface of the valve element forms a closure or near closure with said exhaust gas opening to essentially shut-off the valve, 2) at mid MAP values the valve element forms an essentially maximum opening orifice of area Aex(0) with respect to said exhaust gas opening, 3) at high MAP values near WOT the valve element forms a closure or near closure with said exhaust gas opening to essentially shut the valve, and wherein the valve opening and closing at low MAP values occurs at a first rate or slope defined by a first surface on said valve element with respect to an edge of said exhaust gas opening and the valve closing and opening at high MAP values near WOT occurs at a second rate or slope defined by a second surface on said valve element with respect to an edge of said exhaust gas opening.

9. The apparatus of claim 8 including an annular mount mounted on a section feeding air to said main intake zone on one section of which is mounted said drive and on an opposite end is mounted said valve with said link connecting said drive and valve and traversing the opening of said annular mount.

10. The apparatus of claim 6 including means for sensing engine MAP value and powering said drive to move said valve element in response to MAP value to produce an exhaust fuel ratio, EFR, with respect to MAP value that initially increases with MAP value up to a MAP value MAP1, then stays essentially unchanged or slowly changing for MAP values between MAP1 and MAP2, and then drops with MAP value between MAP2 and WOT.

11. The apparatus of claim 10 wherein said drive comprises step motor means and said controller includes a means for sensing valve element position and providing an output for presenting the valve opening position.

12. The apparatus of claim 11 wherein said valve element position sensing means comprises potentiometer means with imposed voltage and connected to said valve element to provide a voltage in relationship to the valve element position and said controller further including electronic comparator means for comparing the voltage from a MAP sensor with said potentiometer voltage for controlling the valve operation.

13. The apparatus of claim 11 including Lambda sensor means in the exhaust and wherein said controller includes control means used to compare the Lambda sensor voltage with a reference set voltage of approximately 0.4 volts to move said valve element further closed when the lambda sensor voltage exceeds the set voltage to maintain essentially stoichiometric or lean of stoichiometric AFR.

14. The apparatus of claim 11 wherein said valve element is a rotating gate type valve made up of a plate located with its surface parallel to said exhaust gas/exhaust feed opening, which is rotatable by said motor and link to cover and uncover said exhaust gas opening with MAP value.

15. The apparatus of claim 14 wherein said valve element plate has a slot in it for admitting the exhaust gas and is rotatable in its entire range of operation by the approximately 300 degrees of a single turn rotary potentiometer.

16. The apparatus of claim 11 wherein said valve element is a linear type valve with a base-section, narrowed down mid-section, and tip-section, wherein a base-section surface defines a low MAP value closure with an edge of a valve body, the mid-section defines the maximum opening area Aex(0) of Aex, and a tip-section surface defines a high MAP value closure with a valve body edge.

17. The apparatus of claim 11 including engine stability sensor means connected to said controller for controlling the level of exhaust dilution by having said valve opening be responsive to said engine stability sensor.

18. The apparatus of claim 17 wherein said stability sensor provides an output which can be made to indicate less than and greater than optimum engine reference stability and wherein said controller includes control means used to compare said sensor output with a set voltage to move said valve element further closed when said sensor indicates poor engine stability and further open when said sensor indicates better than said reference stability.

19. The apparatus of claim 18 including fuel injection means with Lambda sensor for maintaining closed-loop air-fuel stoichiometric operation.

20. The apparatus of claim 11 including NOx sensor connected to said controller for controlling the level of exhaust dilution by having said valve opening be responsive to said output of said NOx sensor.

21. The apparatus of claim 11 including fuel injection means employing injection timing of approximately 90 degrees crank angle before intake valve opening to produce essentially homogeneous mixture at light loads and slightly reverse stratified mixture at high loads for further reducing NOx emissions.

22. The apparatus of claim 11 comprising a system retrofitable to carbureted IC engines with the carburetor leaned out over some range of MAP values, and further including Lambda sensor which comprises with said controller a closed-loop AFR system for maintaining essentially stoichiometry through controlled admission of said hot exhaust gas at part or all of said carburetor leaned out range of MAP values.

23. The apparatus of claim 11 including high energy ignition means used to achieve GFR value as high as the engine will tolerate with stable operation.

24. Hot gas admission system for an intake zone of an internal combustion, IC, engine including conduit means for hot gas attached at one end to the engines intake zone, valve means for controlling hot gas passage from the conduit to said intake zone and providing variable throttling ranges at two outer ranges of operation and minimum throttling at an intermediate range, intake-zone-pressure-responsive control means for controlling the valve means, the improvement including a minimum gas-fuel ratio, GFR, of 18:1 for a warmed-up engine except at wide-open-throttle, WOT, and hot gas dilution of the intake air at essentially all engine warmed up conditions from just above idle to near WOT, said valve means and control means constructed and arranged to vary the level of hot gas dilution to maintain the engine AFR to within no more than two AFRs of stoichiometry except at idle speed and the GFR to within two AFRs of the maximum level allowable, except at WOT, as defined by acceptable engine stability, to provide good engine efficiency and low NOx emissions.

25. The hot gas admission system of claim 24 including means for attaching its other end to the exhaust zone or exhaust manifold of the engine and further comprising a valve means motor driven mounted at a section of the intake air zone for cooling thereby and driving by linked at a distance to a valve element of said valve means and further comprising cooling and insulating means in said valve means to limit hot gas effect on the motor driver.

26. The hot gas admission system of claim 25 including control means responsive to sensors for measuring engine speed and manifold absolute pressure, MAP, said control means used for controlling said motor to open said valve element for admitting hot exhaust gas in response to speed and MAP.

27. The hot gas admission system of claim 26 including an annular section mounted on a section of the air intake of said intake zone, said annular section including on one side said motor and on an opposite side said valve means with said linked at a distance means connecting said motor and said valve element such that said link traverses the intake air stream.

28. The hot gas admission system of claim 27 comprising a system retrofitable to carbureted IC engines with the carburetor leaned out over some range of MAP values, and said control means operating to maintain essentially stoichiometry or lean of stoichiometric AFR through controlled admission of said hot exhaust gas at part or all of said carburetor leaned out range of MAP values.

29. The hot gas admission system of claim 28 including AFR sensing means which comprises with said controller a closed-loop AFR system.

30. The engine system as defined in claim 29 wherein said carburetor is set in an overall leaned out condition by adjustment of the idle screw and by reducing the orifice of the carburetor main metering jet and wherein the excess air and excess air-fuel ratio, EAFR, of the otherwise leaned out mixture is largely taken up by the exhaust gas to provide exhaust dilution and an exhaust fuel ratio, EFR, approximately equal to the EAFR without said exhaust dilution.

31. The engine system as defined in claim 29 comprising a retrofit system including said hot gas dilution control system with a lambda sensor for said AFR sensing means and a compact catalyst mounted near the exhaust manifold to operate and reduce all three exhaust emissions, NOx, HC, and CO.

32. A process of controlling air fuel ratio, AFR, and exhaust dilution of a lean burn internal combustion engine, with a rotary output, in a warmed up state comprising the steps of
(a) maintaining conditions of (1) approximately constant gas fuel ratio, GFR, of greater than 18:1 through the entire MAP range from idle to near wide-open-throttle, WOT, and (2) a condition at WOT wherein the GFR drops rapidly to provide higher power at WOT,
(b) maintaining a dilution of stoichiometric air-fuel ratio that is essentially entirely excess air dilution at idle rotary speeds of the engine and MAP values below approximately 0.4 atmospheres,
(c) adding exhaust dilution to replace the excess air dilution with increasing MAP value over a transitional MAP range ending at a MAP value of MAPDC where the dilution is essentially entirely by exhaust gas with the excess air fuel ratio, EAFR, being equal to or less than 2.0 AFR.

33. The process of claim 32 wherein the exhaust dilution is provided by a tube connecting the engine air intake to the engine exhaust and including a controlled valve means providing a variable area Aex through which exhaust gas passes to provide said exhaust dilution of the intake air.

34. The process of claim 33 wherein said area Aex of valve, of maximum value Aex(0), is varied through the transitional MAP range where GFR is essentially constant approximately according to the dilution equation:

$$Aex/Aex(0)=(EFR/EFR0)*SQRT(M*N)$$

where EFR is the exhaust fuel ratio with a maximum value of EFR0 which is approximately equal to GFR minus AFR, and M=MAP/MAP1, N=RPM/N1, where MAP1 and N1 are MAP values and engine speed or RPM values which vary with the specifics of the engine type and dilution system type.

35. The process of claim 32 wherein MAPDC is approximately 0.35 atmospheres, and near WOT is defined to mean within approximately 20% of WOT.

36. The process of claim 34 wherein MAP1 is approximately 0.5 and N1 is approximately 2700 RPM.

37. The process of claim 33 wherein a NOx sensor is employed in controlling relation to said controlled valve means to control the level of exhaust dilution so that for a range of prescribed steady state engine operation conditions the NOx emissions produced by the engine are within a prescribed range.

38. The system of claim 37 wherein said range of NOx emissions is within a factor of three of highest times lowest.

39. The system as defined in claim 38 wherein said range is between 200 and 600 parts per million, PPM.

40. The process of claim 33 wherein the said exhaust dilution of intake manifold are constructed and arranged for direct fuel heating.

41. A lean burn internal combustion system comprising at least one combustion chamber with means defining intake and exhaust regions connected to the combustion chamber, the intake region being divided by a throttle into an upstream high pressure side and a downstream low pressure side adjacent the combustion chamber and further comprising a motor driven exhaust dilution means for diluting the intake air with a variable level of exhaust gas dilution tapped from the exhaust region and introduced at the high pressure side of the throttle in the intake region in a controlled manner such that the following dilution equations:

$$EFR/GFR=K(Aex/Aex(0))/SQRT(M*N) \qquad I)$$

where MAP and RPM are below the respective pre-set control values thereof, and $$EFR/GFR=K(Aex/Aex(0)) \qquad (II)$$

where MAP is between two preset control values thereof, the lower one of which is the MAP control value used in equation (I), MAP1, and the higher one is below the MAP at the WOT, MAP2, condition and RPM is above the value thereof used for equation (I) above governing the relationship between exhaust fuel ratio, EFR, and gas fuel ratio, GFR, are utilized to implement controlled air and exhaust dilution by said control means using an air-fuel ratio, AFR, sensor for maintaining:
a) operation above stoichiometric AFR at light engine loads with high GFR,
b) closed-loop feedback controlled engine operation at medium to high loads with high GFR, EFR and essentially stoichiometric AFR, and
c) smooth transition with low fuel consumption and low NOx emissions between light load and high engine load through functioning of said control means in response to the said dilution equations and the engine operating characteristics.

42. The system of claim 41 wherein said exhaust dilution means includes valve means which with said control means are constructed and arranged to provide variable amounts of exhaust dilution with engine manifold absolute pressure, MAP, and insure valve closure during engine cranking.

43. The system of claim 42 wherein said control means are responsive to engine speed to reduce engine dilution with speed from a mid-speed level to a low speed around idle speed.

\* \* \* \* \*